(12) United States Patent
Attanasio (10) Patent No.: US 9,027,139 B2
(45) Date of Patent: May 5, 2015

(54) METHOD FOR MALICIOUS ATTACKS MONITORING

(75) Inventor: Francesco Attanasio, Roccapiemonte (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 11 days.

(21) Appl. No.: 13/981,074

(22) PCT Filed: Feb. 4, 2011

(86) PCT No.: PCT/SE2011/050128
§ 371 (c)(1),
(2), (4) Date: Jul. 22, 2013

(87) PCT Pub. No.: WO2012/105883
PCT Pub. Date: Aug. 9, 2012

(65) Prior Publication Data
US 2013/0305375 A1    Nov. 14, 2013

(51) Int. Cl.
*G06F 12/16* (2006.01)
*H04L 29/06* (2006.01)

(52) U.S. Cl.
CPC ........ *H04L 63/1408* (2013.01); *H04L 63/1425* (2013.01); *H04L 63/145* (2013.01); *H04L 63/30* (2013.01); *H04L 2463/146* (2013.01)

(58) Field of Classification Search
CPC .................................................. H04L 63/1408
USPC ...................................... 726/22–26; 713/188
See application file for complete search history.

(56) References Cited

U.S. PATENT DOCUMENTS

| 7,523,502 | B1 * | 4/2009 | Kennedy et al. ................. 726/24 |
| 8,214,977 | B2 * | 7/2012 | Szor ................................... 26/24 |
| 8,495,742 | B2 * | 7/2013 | Abadi et al. ..................... 726/24 |
| 8,607,347 | B2 * | 12/2013 | Harris et al. ..................... 726/24 |
| 2003/0159069 | A1 | 8/2003 | Choi et al. |
| 2006/0251088 | A1 * | 11/2006 | Thubert et al. ................. 370/401 |
| 2007/0011744 | A1 * | 1/2007 | Carothers et al. ............... 726/24 |

FOREIGN PATENT DOCUMENTS

| EP | 1 401 160 A1 | 3/2004 |
| WO | WO 2010/088963 A1 | 8/2010 |

OTHER PUBLICATIONS

International Search Report, PCT/SE2011/050128, Oct. 13, 2011.
Written Opinion of the International Searching Authority, PCT PCT/SE2011/050128, Oct. 13, 2011.
International Preliminary Report on Patentability, PCT/SE2011/050128, Apr. 29, 2013.

(Continued)

*Primary Examiner* — Amare F Tabor
(74) *Attorney, Agent, or Firm* — Myers Bigel Sibley & Sajovec, P.A.

(57) ABSTRACT

A method monitors data affected by malware in a communication network. The malware detecting entity acts as a data retention source. The method includes receiving at a data retention system a query request specifying data affected by malware to be accessed. Retained data which matches the query request and received from the malware detecting entity is identified in the data retention system. The identified data is forwarded from the data retention system to an authorized organization.

19 Claims, 5 Drawing Sheets

(56) References Cited

OTHER PUBLICATIONS

ETSI TS 102 657 V1.5.1 (Jun. 2010); "Lawful Interception (LI); Retained data handling; Handover interface for the request and delivery of retained data", ETSI Draft, Technical Specification, XP014062839, 101 pages.

ETSI TS 102 656 V1.2.1 (Dec. 2008); "Lawful Interception (LI); Retained data; Requirements of Law Enforcement Agencies for handling Retained Data", ETSI Draft, Technical Specification, XP014062839, 18 pages.

"Directive 2006/24/EC of the European Parliament and of the Council" Mar. 15, 2006; L 105/54, Official Journal of the European Union, Apr. 13, 2006; 10 pages.

* cited by examiner

METHOD FOR MALICIOUS ATTACKS MONITORING

CROSS REFERENCE TO RELATED APPLICATION

This application is a 35 U.S.C. §371 national stage application of PCT International Application No. PCT/SE2011/050128, filed on 4 Feb. 2011, the disclosure and content of which is incorporated by reference herein in its entirety. The above-referenced PCT International Application was published in the English language as International Publication No. WO 2012/105883 A1 on 9 Aug. 2012.

TECHNICAL FIELD

The present invention generally relates to systems and methods and, more particularly, to mechanism and techniques for monitoring data affected by malware in a communication network.

BACKGROUND

In many countries the operators and Internet service providers are today obliged by legal requirements to provide stored traffic data generated from public telecommunication and Internet services for the purpose of detection, investigation and prosecution of crime and criminal offences including terrorism. There are also a number of initiatives within the European Union (EU) to regulate the legal basis for data retention. The EU Parliament has adopted a set of amendments and by that approved the Council's proposed directive on data retention [Directive 2006/24/EC of the European Parliament and of the Council of 15 Mar. 2006]. This proposal describes not only initial requirements, but also how an extension of the directive will be handled. Consequently, an essential part of operator's effort to comply with current legislation will be to secure that processes and tools are adaptable to handle an expansion of the scope for data retention.

ETSI TS 102 656 V1.2.1 gives guidance for the delivery and associated issues of retained data of telecommunications and subscribers. It provides a set of requirements relating to handover interfaces for the retained traffic data and subscriber data by law enforcement and other authorized requesting authorities. The requirements are to support the implementation of Directive 2006/24/EC of the European Parliament and of the Council of 15 Mar. 2006 on the retention of data. ETSI TS 102 657 V1.5.1 (2010-06) contains handover requirements and a handover specification for the data that is identified in EU Directive 2006/24/EC on retained data.

Figure 1:
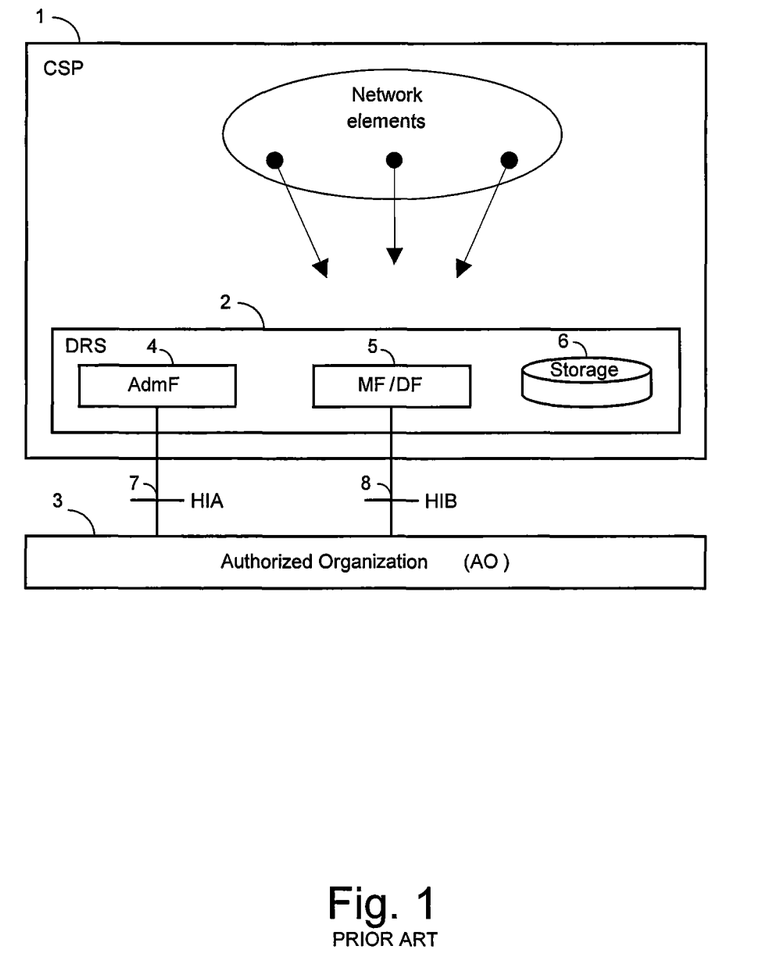
FIG. 1 is part of the prior art and discloses a block schematic illustration of a Data Retention System at a Communication Service Provider CSP attached to an Authorized Organization.

Ericsson Automatic Data Retention System ADRS provides a solution for collecting, storing and delivering communication data generated by telecommunication and Internet services in public fixed and mobile networks. FIG. 1 belongs to the prior art and shows (see ETSI TS 102 656 and ETSI TS 102 657) the Handover Interfaces CIA 7 and HIB 8 between a Data Retention System DRS 2 at a Communication Service Provider CSP 1, and an Authorized Organization AO 3. The figure shows an Administration Function AdmF 4 used to handle and forward requests from/to the AO. A Mediation and Delivery function MF/DF 5 is used to mediate and deliver requested information. Storage 6 is used to collect and retain data from various Network elements. The interfaces through which the CSP receives requests from the Authorized Organization, and transmits responses and information are denoted as Handover Interfaces. The generic Handover Interfaces adopt a two port structure such that administrative request/response information and Retained Data Information are logically separated. The Handover Interface HIA transports various kinds of administrative, request and response information from/to the Authorized Organization and the organization at the CSP which is responsible for Retained Data matters. The Handover Interface HIB transports the retained data information from the CSP, to the Authorized Organization AO. The HIA and HIB interfaces may be crossing borders between countries. This possibility is subject to corresponding national law and/or international agreements. When comparing FIG. 1 in this patent application with e.g. FIG. 2 in ETSI TS 102 657 V1.5.1 (2010-06); "AdmF 4" in FIG. 1 is to be compared with Administration function in FIG. 2 in ETSI TS 102 657, "MF/DF 5" in FIG. 1 is to be compared with Data collection function in FIG. 2 in ETSI TS 102 657 and "6 Storage" is to be compared with Data store management function in FIG. 2 in ETSI TS 102 657.

Mobile devices are used to access many types of services hosted mostly outside the Operator-controlled domain. Therefore, there is an ever-increasing risk that users may download malicious content so called malware that is harmful to the mobile device. Mobile malware can be defined as malicious software that is explicitly targeted at mobile phones to inflict damage, access personal information or defraud the user. As with the PC environment, malware can be classified into various types. These types describe how the software propagates, what kind of payload it has and how it delivers its payload. Common types of malware include viruses, worms, Trojans and spyware. Mobile devices can be infected by viruses or Trojan horses in numerous ways, for example, via MMS messages and downloads. These infections can make the device start sending spam messages that the user does not want to pay for, or it can make the device partially or completely unusable, and thus cause revenue loss for the Operator.

The EU directive and the ETSI TS 102 657 don't require the retention of Malware Information data (e.g. the malware infection information found during a communication). Nevertheless malware information could be used for offline forensic analysis by an Authorized Organization; for instance, once an attack has been detected, it could be possible to go back to see which other devices an infected device has communicated with and that might, thus, also be affected.

SUMMARY

An aim of the invention is to overcome above identified limitations of the prior art. The invention focuses on an enhancement of handover interfaces to retrieve information related to a user's security violation, which retrieved information can be used for analysis of malicious attacks towards other user's security.

According to a first aspect of the invention, a method is provided to monitor data affected by malware in a communication network. A malware detecting entity is acting as data retention source. The method comprises the following steps:

A query request specifying data to be accessed is received to a Data Retention System.

Retained data received from the malware detecting entity which data matches the query request is identified in the Data Retention System.

The identified data is forwarded from the Data Retention System to an Authorized Organization.

According to second aspect of the invention, a method is provided to monitor data affected by malware in a communication network according to the first aspect of the invention. A connection entity is hereby acting as data retention source. The method comprises the following steps:

- A second query request comprising information related to the identified data is received to the Data Retention System, which request specifies connection data to be accessed.
- Retained data received from the connection entity is identified in the Data Retention System. The data matches the second query request.
- The identified data is forwarded from the Data Retention System to an Authorized Organization.

According to a further aspect of the invention there is a Data retention System, or any network node implementing such function comprising means to receive query requests specifying retained data from a malware detecting entity to be accessed, and means to provide the accessed data.

According to yet a further aspect of the invention there is an authorization node, or any network node implementing such function, comprising means to send a query request specifying retained data from a malware detecting entity to be accessed, and means to receive the accessed data.

According to yet a further aspect of the invention there is a Data retention Source, or any network node implementing such function, comprising means to forward requested data to a data retention system.

An object of the invention is to track down malicious attacks for further evaluation. These objects and others are achieved by methods, arrangements, nodes, systems and computer programs.

Some advantages of the invention are as follows:

Messages containing malware constitute a significant percentage of the total multimedia messaging traffic. Traffic data analysis held by the data retention system, may permit post analysis of events that is not available in most real-time security analysis products.

Whenever an attack has been detected, it could be possible to go back to see which other devices an infected device has communicated with and that might, thus, also be affected.

Malware detection service feature in conjunction with the DR functionality could provide new revenue opportunities by offering it as an added value service to Legal Agencies.

The invention will now be described more in detail with the aid of preferred embodiments in connection with the enclosed drawings.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 2:
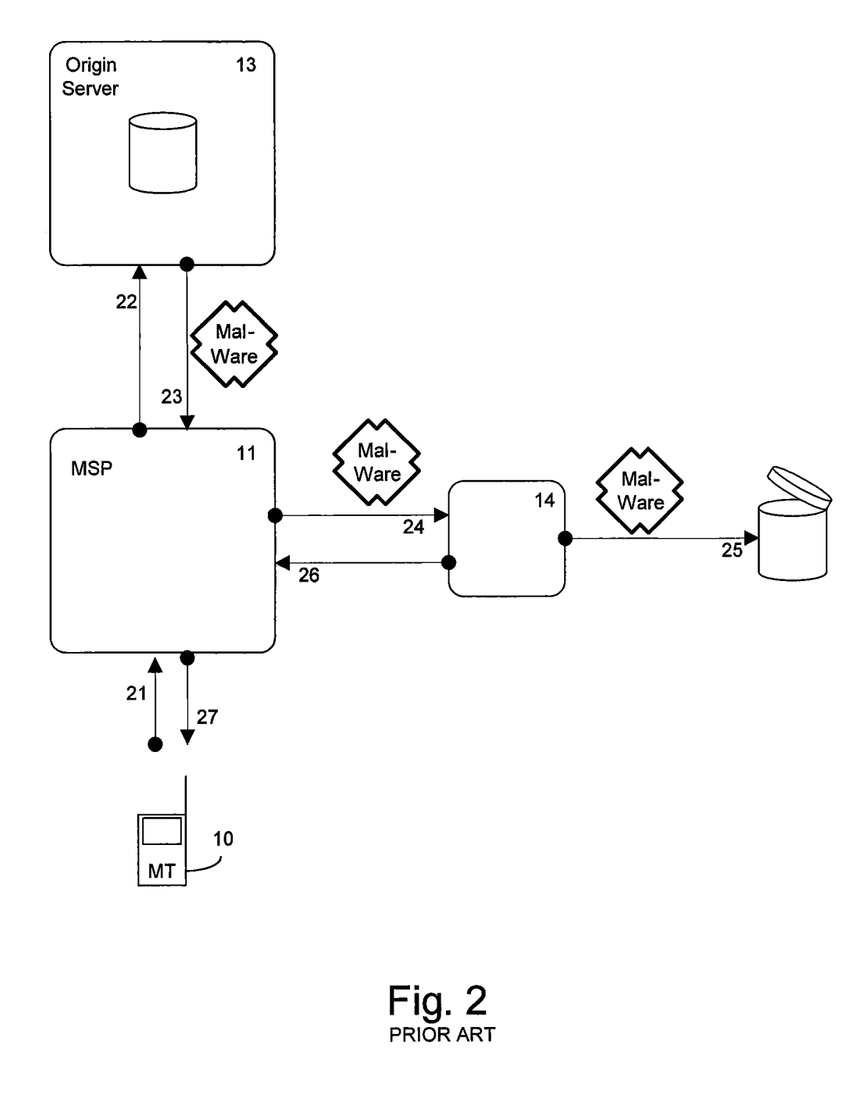
FIG. 2 belongs to prior art and is a block schematic illustration disclosing a Multiservice Proxy environment that in this disclosed example is involved in protecting a mobile device against malicious content.

FIG. 2, that belongs to prior art, discloses a Multiservice Proxy 11. The Multiservice proxy can be deployed in a large variety of 2G, 2.5G, 3G and 4G mobile networks, including GSM, H-CDMA, TDMA, COMA and LTE. Thanks to its central place in a Mobile Internet infrastructure, Multiservice Proxy is the perfect enabler for providing services such as browsing, download, streaming, multimedia messaging and HAP push from operator domain. The Multiservice Proxy MSP 11 in FIG. 2 can be involved in protecting mobile devices against malicious content. Potentially harmful content is sent to an Anti-Virus Scan Engine 14 over an Internet Content Adaptation Protocol ICAP interface. The Anti-Virus Scan Engine can be co-located with the Multiservice Proxy or sit outside of the Multiservice Proxy. In FIG. 2 a mobile terminal 10 requests 21, 22 content from an origin server 13 via the MSP 11. The requested content that in this example is impaired with e.g. virus is sent 23, 24 to the Anti-Virus Scan Engine 14 via the MSP. The malware affected content is discarded 25 and a message notifying the user that the content was infected is sent 26, 27 from the Anti-Virus Scan Engine to the mobile terminal via the MSP. When malware is detected, infection details such as MSISDN, device IP address, requested URL, device type, and a list of detected viruses, are logged in a daily virus-scan log in the MSP.

Another prior art example that uses a malware scanning engine is Malware Protection Solution MaPS. MaPS is a feature for Multimedia Messaging Center MMC that is used to protect the end user's terminal from receiving malware (viruses, Trojans, and worms) and it can also be used to send notifications to the sender of infected messages and to control charging for infected messages. MaPS can be restricted to a Scan-only mode where traffic is scanned for malware and the result of the scanning is logged in the MMC, but all traffic is delivered as usual and no modifications are made to the messages and no notifications are sent.

Below is reported a Charging Data Record CDR example related to an originating MMS including malware information (marked):

| | Originate Message CDR | |
|---|---|---|
| ASCII TAG Base Radius | Field Section | Example Value |
| cg | Originator | (9) cg = 178914821/ |
| de | Destination | (9) de = 178914309/ |
| id | CDR Transaction ID | (20) id = 10246077105261017043/ |
| mi | MMS Message Id | (4) mi = 1140/ |
| ni | MMS-SAS-Identifier | (11) ni = relay/tn-00 |
| po | SAS Port | po = 23/ |
| ty | Account Status Type | ty = 12/ |
| vs | Vendor Specific | (4) vs = / |
| | Vendor Specific Section | |

-continued

Originate Message CDR

| ASCII TAG Base Radius | Field Section | Example Value |
|---|---|---|
| ac | Access Correlation ID | (3) ac = 546/ |
| di | Destination IMSI | (12) di = 908431309121/ |
| ed | Event Disposition | ed = 1/ |
| ep | Event Messaging Priority | ep = 5/ |
| et | Message Type | et = 1/ |
| ex | Expiration Time | ex = 20020622T211510Z/ |
| fd | Future Delivery Date | fd = 20020620T211510Z/ |
| ft | Free Text | (18) ft = Britney_JacksonPIC |
| fw | Forward/Copy Ind | fw = 0/ |
| gi | Unique Message Group ID | (4) gi = 1140/ |
| go | GMTOffset | (6) go = −18000 |
| ii | Incoming Interface ID | (3) ii = 125 (for MM3) |
|  |  | (3) ii = MM1 (for MM1) |
|  |  | (3) ii = VASP2 . . . 777 (for MM7) |
| in | MMS Identifier | (36) in = Ericsson Multimedia Messaging Center/ |
| it | MMS CDR Tag | it = 5/ |
| lb | Invalid Recipients List | (7) lb = 1234567/ |
| mn | MalwareName | mn = W32.Chir.B@mm (html) |
| mp | Message Priority | mp = 1/ |
| nb | Number Of Invalid Recipients | nb = 1/ |
| or | Originator IMSI | (12) or = 908431309121/ |
| rm | Reference Message Id | (4) rm = 1140/ |
| rp | Roaming Price | (4) rp = 0.05/ |
| rr | recipientRoamingIndicator |  |
| rt | CDR Record Type | rt = MM3Orecord/ |
| sr | ScanResult | sr = Found |
| st | Submission Time | st = 20020620T101510Z/ |
| ua | userAgent | ua = SonyEricssonT618/R101 |

Figure 3:
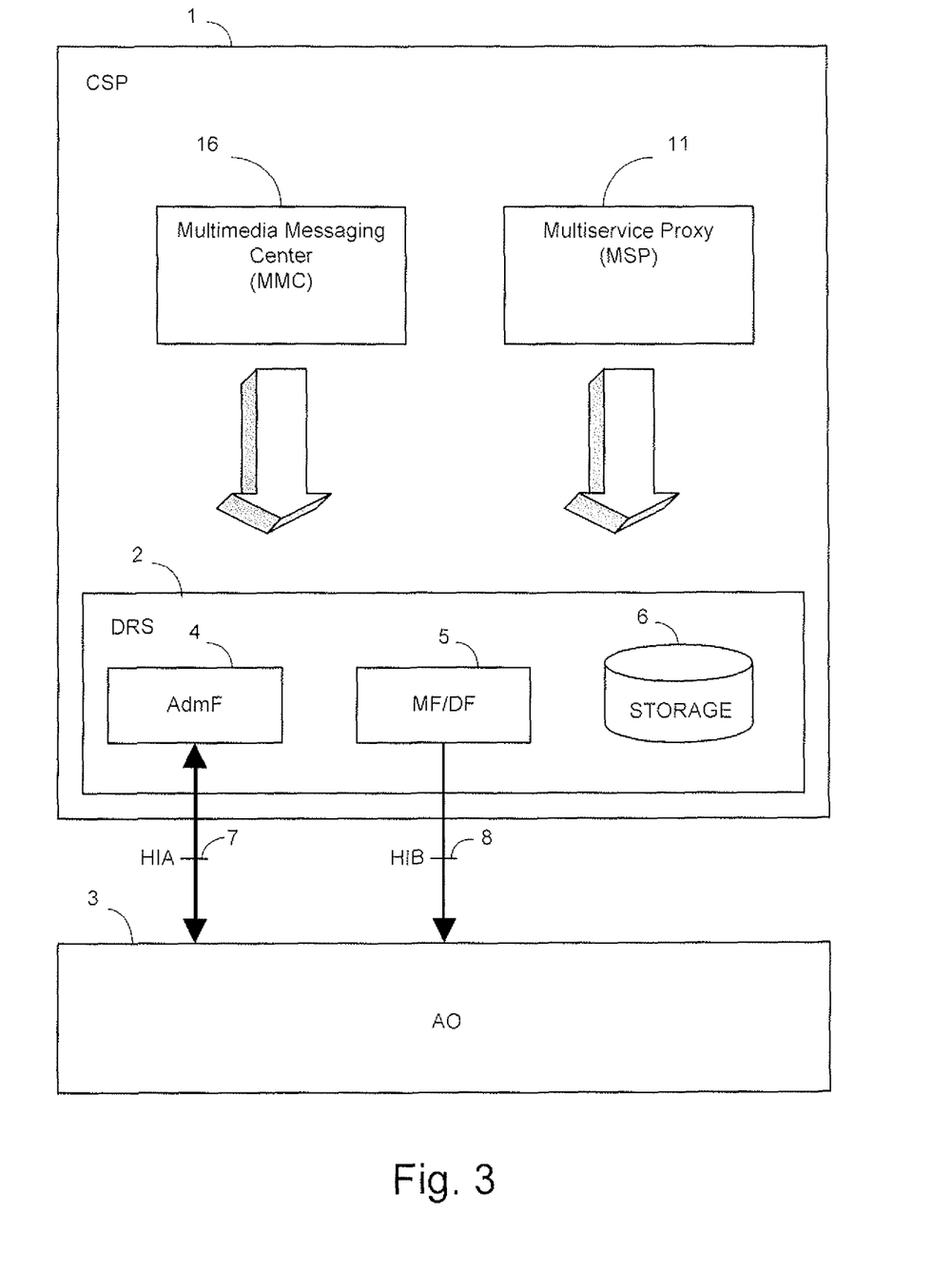
FIG. 3 is a block schematic illustration of a Data Retention System at a Communication Service Provider attached to an Authorized Organization whereby a Multiservice Proxy and a Multimedia Messaging Centre are acting as data retention sources.

FIG. 3 is a block schematic illustration of a Data Retention System at a Communication Service Provider CSP attached to an Authorized Organization AO. The earlier explained Multiservice Proxy MSP 11 and Multimedia Messaging Centre MMC 16 are according to the invention in this example acting as data retention sources. The entities 1-8 have been explained earlier together with FIG. 1. The transportation of data from the data retention sources i.e. from 11 and 16 to the MF/DF 5 is schematically shown with filled arrows in FIG. 3. Data records are hereby transferred to the mediation function ME/DF 5 in the DRS 2, and data fulfilling configured filtering criteria are mediated from MF/DF to the Storage 6. Updating of the Storage depends on the policy regulating the notifications with the user, session or operator related data, from the data retention source towards the storage. A pre-requisite for this invention is that data records including infection details have been transported from e.g. 11 and/or 16 to storage 6.

A method according to a first embodiment of the invention will now be explained together with FIG. 4. The signaling points Multiservice Proxy 11, DRS 2, MR/DR 5, Storage 6, ADMF 4 and AO 3 have all been shown and briefly explained earlier together with previous figures. The signaling point 16 marked with dotted lines in FIG. 4 will be further mentioned at the end of the explanation of the first embodiment. The Handover. Interfaces HIA 7 and HIB 8 have been indicated in FIG. 4. According to the invention the Handover Interface HIA 7 has been enhanced to deliver requests from AO to AdmF, which requests are related to data affected by malware. The Handover Interface HIB 8 has been enhanced to deliver the data affected by malware. The method comprises the following steps:

In this example the following web browsing event data records including infection details (also called malware) stored in a daily virus-scan log have been transported 40 from the Multiservice Proxy 11 to Mediation and Delivery Function MF/DF 5 in the DRS, at a configured time interval:

MSISDN.
Requested URL.
Device IP address.
Device type.
List of detected viruses

Software logic is hereby implemented in the Multiservice Proxy so that this data identifying malware is provided to the DRS. As mentioned, this is an example and also other records including infection details may be transported from the Multiservice Proxy to storage.

The Data Records, after mediation in the Mediation and Delivery Function MF/DF 5 is in dependence of policy, transferred 41 from MF/DF and stored in the Data Retention Storage 6.

A query request for retrieving retained information concerning web browsing data affected by malware in a specified time window is according to the invention in this example determined by the Authorized Organisation AC 3 and sent 42 to the Administration Function AdmF 4. The query request is received by the AdmF via the enhanced Handover Interface HIA 7. This request is not time correlated to the previous step and may be sent at any point of time as long as it follows after the transfer 41 in previous step.

The AdmF informs 43 the Mediation and Delivery function MF/DF 5 of the request.

The request is sent 44 from the MF/DF 5 to the Storage 6.

The retained requested information, i.e. all retained information related to web browsing data affected by malware, is found and transferred 45 from the Storage 6 to the Mediation and Delivery function MF/DF 5.

The fetched information is sent 46 as Event data records from the MF/DF 5 through the enhanced interface HIS 8, to the AO 3.

The main impact on Handover Interface HIS is related to following enhancements about malware data:

| User attributes enhancements | Description |
|---|---|
| MalwareName | This attribute indicates the name of the malware infection found by the Scan Engine. |
| ScanResult | This attribute returns the result received from the Scan Engine or the system result (e.g. Found Indicates that a malware infection was detected, but the system did not clean it (SCAN_ONLY). Cleaned Indicates that the message was cleaned by the Scan Engine. |

The reciprocal signaling between the above different Data Retention entities is to be seen just as example. For example can the Storage be an integrated part of the MF/DF. In this example the query requests are sent from the AO but may also be communicated by an intermediary, such as a human operator who receives the command from an authorized source, and then inputs the requests to the DRS.

Figure 4:
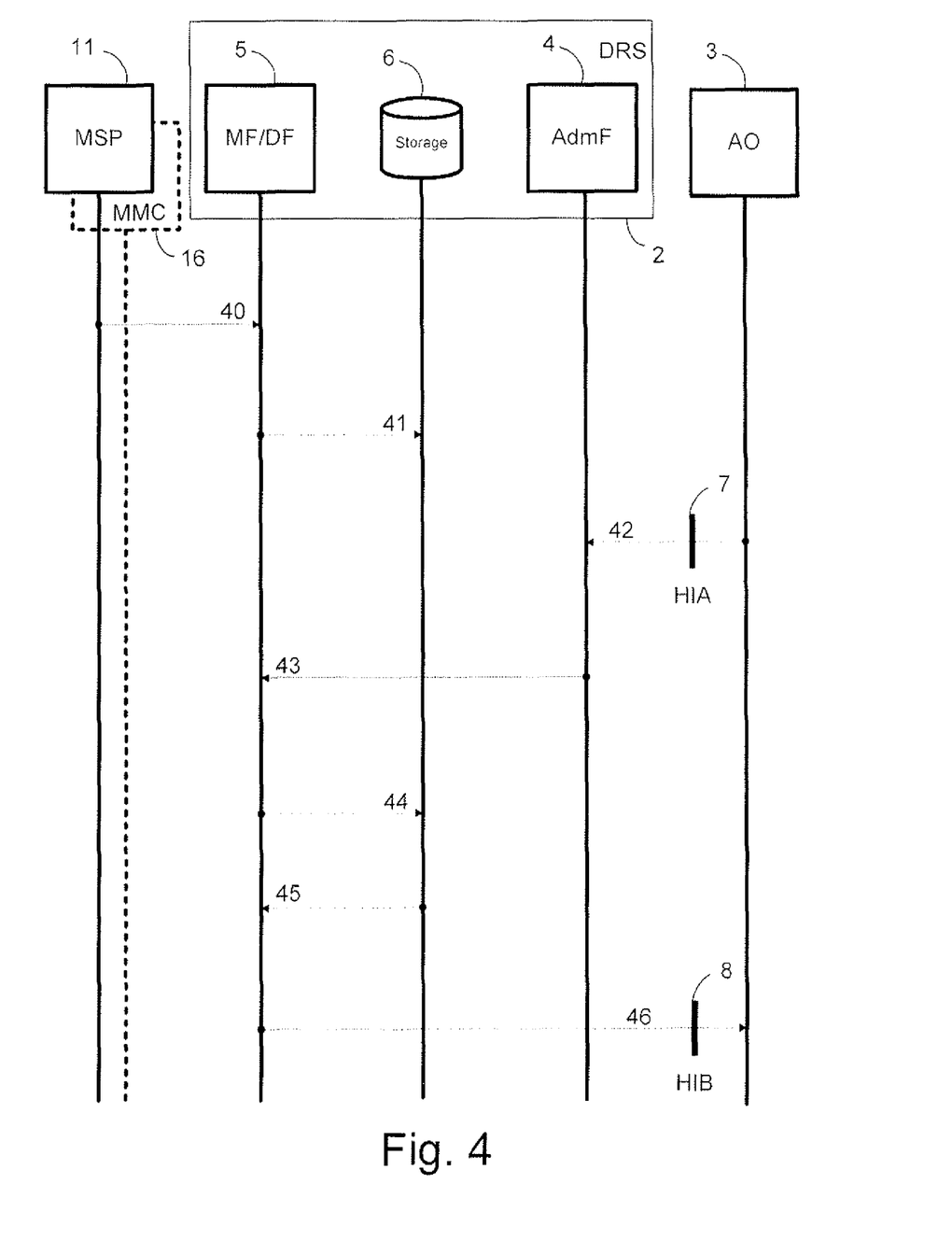
FIG. 4 discloses a signal sequence diagram representing collecting and handling of data related to user security violations.

Also other malware detecting entities apart from the Multiservice Proxy 11 can according to the invention act as data retention source, for example the Multimedia Messaging Centre MMC 16 that has been indicated in FIG. 4. In this case virus scanning can be performed when downloading a Multimedia Messaging Service MMS to a mobile terminal or when sending an MMS to a mobile terminal. The result of the scanning is hereby logged in the MMC and Multimedia Messaging Data records including malware info data are transferred from the MMC to the DRS at a configured time interval in a similar way as described in the example above. At any moment in time after the transfer, the AO may submit a request to query the data retention database for retrieving information concerning Multimedia Messaging data affected by malware in a selected time window. The query can be received in ADMF via the enhanced HI-A and passed on to the DRS Storage through the Data Retention System Mediation Function/Delivery Function. From DRS storage, DRS MF/DF delivers the results of the query, i.e. Multimedia messaging data including detected malware information to AO, through the enhanced HI-B.

Another example of an entity that is capable of delivering data affected by malware and consequently can act as data retention source is an Intrusion Detection System/Intrusion Prevention System IDS/IPS.

Figure 5:
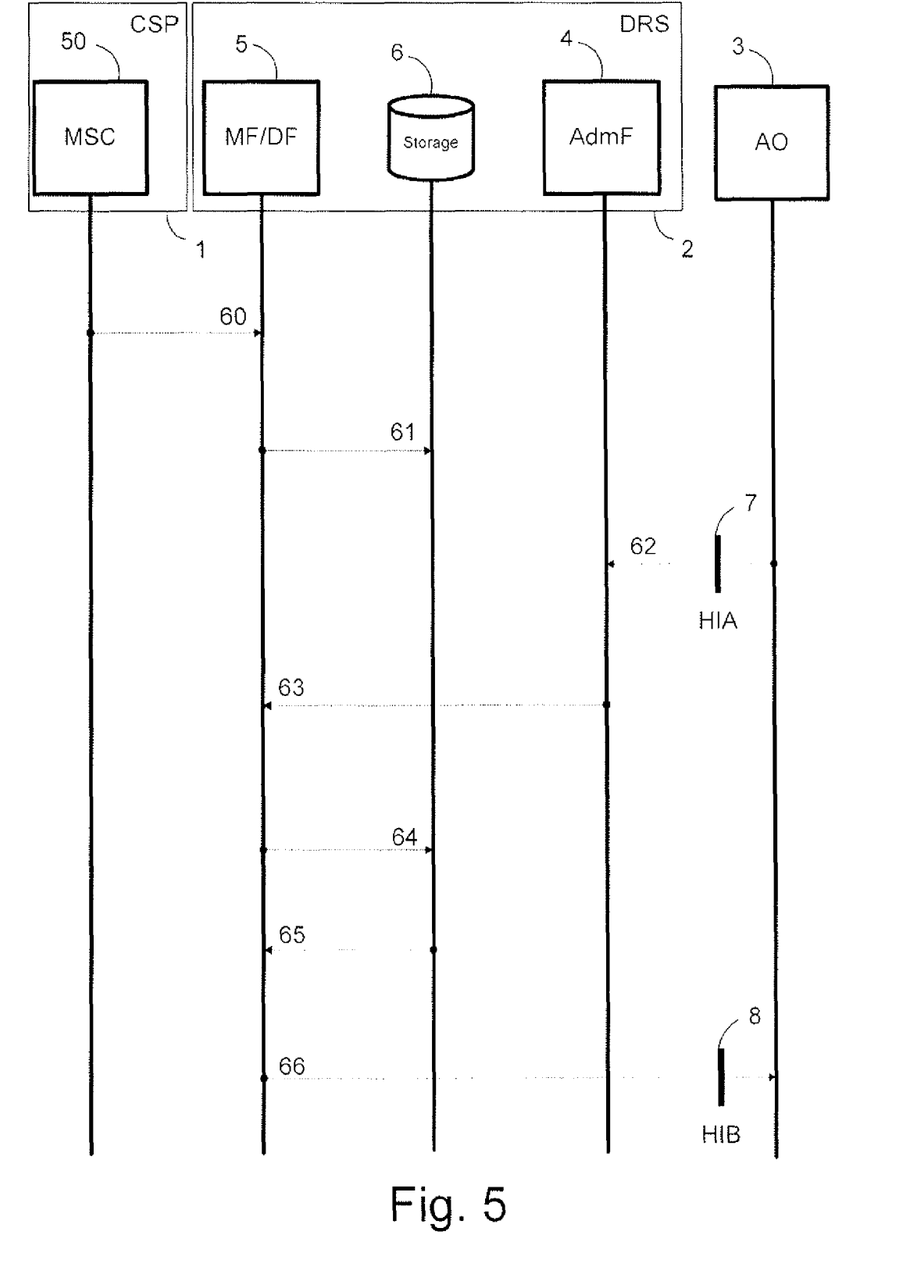
FIG. 5 discloses a signal sequence diagram representing an example of post processing of data related to user security violations.

A further embodiment of the invention will now be discussed. Traffic data analysis held by the data retention system may permit post analysis of events that is not available in most real-time security analysis products. Whenever an attack has been detected as described in the previous embodiment, it is possible to go back to see which other devices an infected device has communicated with and that might, thus, also be affected. A pre-requisite for the example that now will be explained is that e.g. a virus has been detected and in this example a Mobile Station International Subscriber Directory Number MSISDN has been identified. The MSISDN identifies a mobile subscriber. A whose mobile equipment has been impaired by the virus. FIG. 5 discloses the further embodiment of the invention. The already explained entities MF/DF 5, Storage 6, AdmF 4, and AO 3 can be seen in FIG. 5. In this example the Communication Service Provider CSP 1 comprises a Mobile Subscriber Center MSC 50 acting as data retention source. The MSC transfers 60, 61 in this example data via MF/DF 5 to the storage 6. The data comprises information of call that has been set up between different subscribers. To be noted is that the MSC is just an example and also other entities e.g. a Short message service Centre SMS-C, a Multimedia Messaging Centre MMC etc can provide data of the same type to the DRS. These type of entities (MSC, SMS-C, MMC) where spreading of malware can be detected, are in this patent application referred to by a generic term "connection entities". The method according to the invention comprises the following further steps:

A query request, also called a second query request, for retrieving retained information concerning call set-up involving the subscriber A (that was found infected) is in this example determined by the Authorized Organisation AO 3 and sent 62 to the Administration Function AdmF 4. In this example the request, beyond an identity of the subscriber A, also comprises Malicious Monitoring ID that is used in order to identify requests different from other traffic retained data requests. The Malicious Monitoring ID is used to indicate that the requested data concerns an investigation of potentially spread malicious content. The same Malicious Monitoring ID will later be reported on the enhanced interface HID 8 and used as correlation mechanism for malicious monitored data received from different connections. The query request is received by the AdmF via the enhanced Handover Interface HIA 7.

The AdmF informs 63 the Mediation and Delivery function MF/DF 5 of the request.

The request is sent 64 from the MF/DF 5 to the Storage 6.

The retained requested information is found and transferred 65 from the Storage 6 to the Mediation and Delivery function MF/DF 5. In this example subscriber A has been involved in call connections with a subscriber B and a subscriber C.

The fetched information is sent 66 as Event data records from the MF/DF 5 through the enhanced interface HID 8, to the AO 3. As mentioned above the Malicious Monitoring ID is also reported on the enhanced interface HIB 8 and used as correlation mechanism.

It can now be assumed that also subscriber B and subscriber C are infected by the virus and measures can be taken accordingly.

One Data Retention System can be used to monitor malicious attacks coming from several networks that may be geographically separated. An operator only needs to buy one Data Retention System for analyzing user security violations. An Operator can provide Data Retention services to their affiliate operators and malicious attacks monitoring DR services to small. Mobile Virtual Network Operators that do not need the full capacity of a Data Retention System. One physical Data Retention System node can be divided into up to several (e.g. 10) Virtual Nodes each of them hosting Data Retention functionality for a small operator. For example, the Multiservice Proxy allows affiliate Operators, which use a Multiservice Proxy virtual gateway as the proxy for browsing traffic, to transfer CDR including malware information data to Data Retention System. The Multiservice Proxy can be configured to store CDR data specific for each virtual gateway in separate files and folders. The SFTP transfer of these files is defined using file transfer scripts. By configuring virtual gateways and CDR for each affiliate operator, the post processing effort in the Data Retention System is minimized. The Virtual Gateway name reported in CDRs indicates which Virtual Gateway is used.

A system that can be used to put the invention into practice is schematically shown in FIG. 3. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method to monitor data affected by malware in a communication network comprising the following steps:
    retaining in a Data Retention System data related to malware infections in the communication network where the retained data is received from a malware detecting entity;
    receiving at the Data Retention System a first query request specifying data affected by malware;
    identifying in the Data Retention System, responsive to the first query request, retained data received from the malware detecting entity which data matches the first query request;
    generating a first response to the first query request which includes the identified data;
    transmitting the first response, from the Data Retention System to an Authorized Organization, whereby a connection entity is acting as a data retention source;
    receiving at the Data Retention System a second query request comprising information related to the identified data, which request specifies connection data related to the identified data;
    identifying in the Data Retention System, responsive to the second query request, retained connection data received from the connection entity which data matches the second query request;
    generating a second response to the second query request which includes the identified connection data; and
    transmitting the second response, from the Data Retention System to the Authorized Organization.

2. The method to monitor data affected by malware in a communication network according to claim 1, wherein the information in the second request comprises a subscriber identity that is matched by the Data Retention System to the connection data received from the connection entity.

3. The method to monitor data affected by malware in a communication network according to claim 2, wherein the second query request comprises a Malicious Monitoring identity, where the Malicious Monitoring identity indicates that the second query request concerns an investigation of potentially spread malicious content.

4. The method to monitor data affected by malware in a communication network according to claim 1, wherein the data from the malware detecting entity comprises Multimedia Messaging data and/or Web Browsing data.

5. The method to monitor data affected by malware in a communication network according to claim 1, wherein at least one first query request is sent to the Data Retention System from the Authorized Organization via a first Handover Interface.

6. The method to monitor data affected by malware in a communication network according to claim 1, wherein data forwarded from the Data Retention System to the Authorized Organization is sent the via a second Handover Interface.

7. The method to monitor data affected by malware in a communication network according to claim 1, wherein the malware detecting entity comprises virtual gateways, each gateway configured for an affiliate operator.

8. A network node of a Data Retention System comprising:
    circuitry to retain data related to malware infections in a communication network where the retained data is received from a malware detecting entity,
    circuitry to receive a first query request specifying retained data from the malware detecting entity to be accessed,
    circuitry for generating a first response to the first query request which includes the specified data responsive to the first query request,
    circuitry to transmit the first response,
    circuitry to receive a second query request specifying retained connection data from a connection entity to be accessed, where the retained connection data is related to the data from the malware detecting entity,
    circuitry to generate a second response to the second query request which includes the specified connection data responsive to the second query request; and
    circuitry to transmit the second response.

9. An authorization node comprising:
    circuitry to send a first query request specifying retained data from a malware detecting entity to be accessed, where the retained data from the malware detecting entity comprises data related to malware infections in a communication network;
    circuitry to receive a first response to the first query request which contains the specified data responsive to the first query request;
    circuitry to send a second query request specifying retained connection data from a connection entity to be accessed, where the second query request contains a subscriber identity of a first user of the communication network, and
    circuitry to receive a second response to the second query request which contains the specified connection data responsive to the second query request.

10. An arrangement adapted to monitor data affected by malware in a communication network, which comprises:
    circuitry for retaining at a Data Retention System data related to malware infections in the communication network where the retained data is received from a malware detecting entity;
    circuitry for receiving at the Data Retention System a first query request specifying data affected by malware;
    circuitry for identifying in the Data Retention System, responsive to the first query request, retained data received from the malware detecting entity which data matches the first query request;
    circuitry for generating a first response to the first query request which includes the identified data;
    circuitry for transmitting the first response, from the Data Retention System to an Authorized Organization, whereby a connection entity is acting as a data retention source;
    circuitry for receiving at the Data Retention System a second query request comprising information related to the identified data, which request specifies connection data related to the identified data, to be accessed;
    circuitry for identifying in the Data Retention System, responsive to the second query request, retained connection data received from the connection entity which data matches the second query request;
    circuitry for generating a second response to the second query request which includes the identified connection data; and circuitry for transmitting the second response, from the Data Retention System to the Authorized Organization.

11. The method to monitor data affected by malware in a communication network according to claim 2, wherein the identifying in the Data Retention System, responsive to the second query request, retained connection data received from the connection entity which data matches the second query request, comprises:

matching a Mobile Station International Subscriber Directory Number (MSISDN) from the second query respond to the connection data received from the connection entity.

12. The network node of claim 8, wherein the retained connection data related to the data from the malware detecting entity in the second request comprises a subscriber identity.

13. The network node of claim 12, wherein the subscriber identity comprises a Mobile Station International Subscriber Directory Number (MSISDN).

14. The authorization node of claim 9, wherein the subscriber identity of the first user comprises a Mobile Station International Subscriber Directory Number (MSISDN).

15. The authorization node of claim 9, where the received specified connection data responsive to the second query request comprises connection information between the first user and a second user of the communication network.

16. The authorization node of claim 15, further comprising circuitry to analyze the received specified connection data responsive to the second query request to determine that the second user is at risk for a malware infection.

17. The method to monitor data affected by malware in a communication network according to claim 1, wherein the Authorized Organization comprises an authority legally authorized to request or receive retained data.

18. An arrangement adapted to monitor data affected by malware in a communication network according to claim 10, wherein the Authorized Organization comprises an authority legally authorized to request or receive retained data.

19. A method to monitor data affected by malware in a communication network-comprising the following steps:

retaining infection data corresponding to detected malware infections discovered in a communication network within a first storage, wherein the retained infection data is received from a malware detecting entity;

retaining connection data corresponding to connections made in the communication network within a second storage, wherein the retained connection data is received from a connection entity;

receiving a first query request from a sender requesting data related to detected malware infections;

identifying, responsive to the first query request, retained infection data received from the malware detecting entity which matches the first query request, where the identified infection data comprises a subscriber identity for a first communication network user which is affected by a malware infection;

generating a first response to the first query request which includes the identified infection data matching the first query request;

transmitting the first response to the sender;

receiving a second query request from the sender which requests connection data related to the identified infection data;

identifying, responsive to the second query request, retained connection data received from the connection entity which matches the second query request, where the identified connection data comprises a subscriber identity for a second communication network user which established a prior connection to the first communication network user;

generating a second response to the second query request which includes the identified connection data matching the second query request; and transmitting the second response to the sender.

* * * * *